(12) United States Patent
Rossi

(10) Patent No.: US 8,686,687 B2
(45) Date of Patent: *Apr. 1, 2014

(54) METHOD AND SYSTEM FOR CO-OPERATIVE CHARGING OF ELECTRIC VEHICLES

(71) Applicant: John Rossi, Norcross, GA (US)

(72) Inventor: John Rossi, Norcross, GA (US)

(73) Assignee: Comverge, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,499

(22) Filed: Oct. 28, 2012

(65) Prior Publication Data

US 2013/0141043 A1 Jun. 6, 2013

Related U.S. Application Data

(63) Continuation of application No. 12/699,019, filed on Feb. 2, 2010, now Pat. No. 8,324,859, which is a continuation-in-part of application No. 12/335,009, filed on Dec. 15, 2008, now Pat. No. 8,106,627.

(51) Int. Cl.
*H02J 7/00* (2006.01)
*H02J 7/04* (2006.01)
*H02J 1/10* (2006.01)

(52) U.S. Cl.
USPC ............................. 320/109; 320/104; 307/18

(58) Field of Classification Search
USPC .................................................. 320/109, 104
See application file for complete search history.

(56) References Cited

U.S. PATENT DOCUMENTS 5,642,270 A 6/1997 Green et al.
5,684,379 A 11/1997 Svedoff (Continued)

FOREIGN PATENT DOCUMENTS

JP 10-262304 A 9/1998
JP 2005-204418 A 7/2005

(Continued)

OTHER PUBLICATIONS

Coulcomb Technologies Announces New Smart Charging Infrastructure for Plug-in Vehicles, Smart Charging Stations. Payment Subscriptions and Utility Grid Management Target New Market of Plug-in Vehicles. Jul. 21, 2008. www.coulombtech.com/press_release/release_20080721.php. pp. 1-4.

(Continued)

*Primary Examiner* — M'Baye Diao
(74) *Attorney, Agent, or Firm* — Smith Risley; Steven P. Wigmore

(57) ABSTRACT

A method and system provide for the cooperative charging of electric vehicles. By using power line communications, chargers of the electric vehicles who are serviced by the same distribution transformer can form self-contained local area networks due to the nature of power line communications (PLCs). Alternatively, or in addition to the PLCs, other communication networks, such as the Internet and local area networks, may be used as part of the communications infrastructure for the chargers. After the chargers of the electric vehicles are coupled to one another through power line communications or traditional communications networks, they can form a logical token ring network. According to this token ring network, a predetermined number of tokens can be assigned within the token ring network for permitting chargers with tokens to charge respective electric vehicles while chargers without tokens must wait until they receive a token to initiate charging.

20 Claims, 12 Drawing Sheets

(56) References Cited

U.S. PATENT DOCUMENTS

| | | | |
|---|---|---|---|
| 6,724,100 | B1 | 4/2004 | Gabriel |
| 7,402,978 | B2 | 7/2008 | Pryor |
| 7,747,739 | B2 | 6/2010 | Bridges |
| 2003/0208291 | A1* | 11/2003 | Belliveau .................. 700/90 |
| 2006/0152189 | A1 | 7/2006 | Ambrosio et al. |
| 2006/0219448 | A1 | 10/2006 | Grieve et al. |
| 2006/0250902 | A1 | 11/2006 | Bender et al. |
| 2007/0126395 | A1 | 6/2007 | Suchar .................. 320/109 |
| 2007/0129850 | A1 | 6/2007 | Miyaji |
| 2008/0007202 | A1 | 1/2008 | Pryor |
| 2008/0040296 | A1 | 2/2008 | Bridges et al. |
| 2009/0210357 | A1 | 8/2009 | Pudar |
| 2011/0175569 | A1* | 7/2011 | Austin .................. 320/109 |

FOREIGN PATENT DOCUMENTS

| | | |
|---|---|---|
| WO | WO 2006/107807 A2 | 10/2006 |
| WO | WO 2008/039725 A2 | 4/2008 |
| WO | WO 2008/073472 A2 | 6/2008 |
| WO | WO 2008/073476 A1 | 6/2008 |

OTHER PUBLICATIONS

Martin Lamonica, Car Source Kelley Blue Book Goes Green, http://news.cnet.com/greentech?, Jul. 31, 2008, 9 pgs.

Market, T.; Simpson, A. et al., Energy Storage Systems Consideration for Grid-Charged Hybrid Electric Vehicles, IEEE Vehicle Power and Propulsion. Sep. 2005, 1 pg.

About V2Green. http://www.v2green.com, 2006, 1 pg.

Plug-in Hybrids—One Little Detail. The Smart Grid. Jul. 30, 2008, Link to Website WEB, 1 pg.

Plug-in Hybrid Vehicles—A Vision for the Future, Jul. 30, 2008. Link to Website WEB. 1 pg.

Choi, T. Gabriel, et al., Design and Control of Commuter Plug-in FC Hybrid Vehicle, Sep. 16, 2007, Technical Papers. Consiglio Nazionale delle Ricerche, Naples, Italy, International Conference on Engines for Automobile, 1 pg.

Software Startup Targets Vehicle-to-Grid Management, Green Car Congress, Oct. 5, 2007, 9-pgs.

Denholm, P. et al., Evaluation of Utility System Impacts and Benefits of Optimally Dispatched Plug-in Hybrid Electric Vehicles (Revised), Oct. 1, 2006, National Renewable Energy Laboratory, Abstract, 1 pg.

Dr. Mo-Yuen Chow, North Carolina State University, Distributed Generation, ADAC Lab. Dept. of ECE, 1 pg.

PCT Application No. PCT/US2011/023082, Method and System for Co-operative Charging, Inventor: John Rossi, International Search Report dated Sep. 28, 2011: one page.

* cited by examiner

274

Welcome to your Vehicle Charge Manager — 276

278 — Please enter the shortest distance you will travel for your next trip
_____ miles 280 — Please enter the longest distance you will travel for your next trip
_____ miles 282 — Please enter the price you wish to pay to purchase the energy
_____ dollars/KWH 284 — Do you wish to upload any of your vehicle's energy for sale to the grid?

286 — If yes, please enter lowest price at which you will sell your vehicle's energy _____ dollars/KWH 288 — Please enter the time, date you will need your charged vehicle.

| hh:mm | mm/dd/year |

*FIG. 2C*

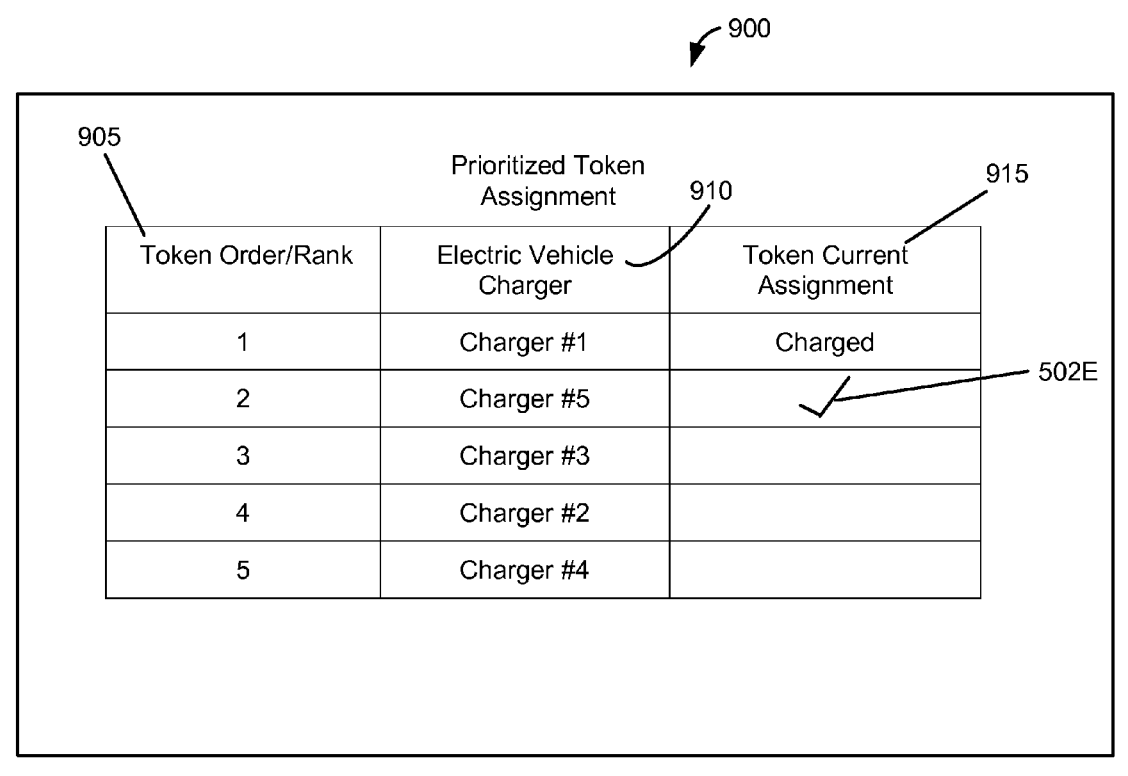

| Token Order/Rank | Electric Vehicle Charger | Token Current Assignment |
| --- | --- | --- |
| 1 | Charger #1 | Charged |
| 2 | Charger #5 | ✓ |
| 3 | Charger #3 | |
| 4 | Charger #2 | |
| 5 | Charger #4 | |

*FIG. 9*

METHOD AND SYSTEM FOR CO-OPERATIVE CHARGING OF ELECTRIC VEHICLES

PRIORITY AND RELATED APPLICATIONS STATEMENT

The present application is a continuation of non-provisional patent application entitled "Method and System for Co-Operative Charging of Electric Vehicles," filed on Feb. 2, 2010 and assigned U.S. application Ser. No. 12/699,019, which is also a continuation-in-part of non-provisional patent application entitled "Method and System for Co-Operative Charging of Electric Vehicles," filed on Dec. 15, 2008 and assigned U.S. application Ser. No. 12/335,009. The entire contents of these non-provisional patent applications mentioned above are hereby incorporated by reference.

TECHNICAL FIELD

The invention is generally directed to electric vehicles and energy storage devices, and relates more particularly to the cooperative charging of electric vehicles

BACKGROUND OF THE INVENTION

With the demand for alternative fueled, environmentally friendly or "green" vehicles are on the rise, electric vehicles and will become the vehicles of choice because of their zero emissions and their efficiency. Each electric vehicle may require a large amount of power to recharge. Many electric vehicle prototypes as of this writing have a storage capacity of 35 kWh or greater. Each electric vehicle may require a recharge within a limited period of time, most likely overnight. In addition, batteries may supply power back into the grid during certain conditions and this interaction must be controlled as well as the charging activities.

As more and more electric vehicles come on line for being charged, this could cause a tremendous strain on existing power grids even if most charging of electric vehicles occurs in off peak hours. The EV load during charging or discharging could approach 75 Amps per vehicle. This level of current draw could overload existing distribution transformers if several vehicles attempt to charge simultaneously in conjunction with other normal loads on the transformer like HVAC etc. Increasing the size of existing transformers to meet this potential demand could prove to be very costly. Also, simultaneous charging across the entire grid could cause overloads higher on feeders or substations higher in the grid hierarchy.

As mentioned, this potentially large electric vehicle charging load would add to the present load on the distribution system. A large contributor to the present load on the electric power distribution system is Heating Ventilation and Air Conditioning (HVAC) systems in addition to other large appliances like electric clothes dryers and electric ranges.

A focus of upgrades to the electric grids could include distribution transformers. Distribution transformers are generally positioned in proximity of homes, which will also house any electric vehicles. Each transformer usually has a limited amount of supply current for charging large loads, like electric vehicles.

Currently, some solutions exist which manage the additional load that electric vehicles may place on existing power grids. FIG. 1 illustrates one such prior art solution.

FIG. 1 illustrates a prior art power grid system 10 that can include a central controller 12, a substation 14, a feeder 16, a distribution transformer 18, and electric vehicle chargers 20.

The central controller 12 can be coupled to the substations 14 which are in turn coupled to feeders 16. The feeders 16 may be coupled to distribution transformers 18. The distribution transformers 18 can be coupled to and support various electric vehicle chargers 20.

The power grid system 10 functions as a power distribution system/network that connects producers of power with consumers of power. The power grid system 10 may include, but is not limited to, any one of generators, transformers, interconnects, switching stations, and safety equipment. As illustrated in prior art FIG. 1, a central controller 12 can service at least two different substations 14A, 14B. The central controller 12 can be designed to manage the extra demand or additional load that can be attributed to the numerous electric vehicle chargers 20 that can be brought online to support the battery storage of numerous electric vehicles.

One of the main problems of this prior art central controller 12 model is that it will require tremendous computing power to manage all of the variables associated with the charging of electric vehicles from a central location. If there are any problems with the central controller 12, such problems could directly impact numerous customers with electric vehicles. In addition to this system 10 having a single point of critical failure, this central controller 12 may require additional infrastructure behind the power grid system 10 itself so that the central controller 12 can communicate with each electric vehicle charger 20. For example, the central controller 12 may require an Internet connection or a wireless network connection in order to communicate with the electric vehicle chargers 20. This is on top of the communications infrastructure needed by the central controller 12 to communicate with monitoring points on the substations 14 and the feeders 16.

Accordingly, there is a need in the art for a system and method that can locally and autonomously manage the demand or load presented by electric vehicles and which does not require significant additional communications infrastructure. There is a need in the art to eliminate single point of failure designs so that groups of electric vehicle chargers may operate independently of one another. Also, such a solution, operating at the transformer level could offer control at the feeder and substation level as well.

SUMMARY OF THE INVENTION

A method and system provide for the cooperative charging of electric vehicles. The method and system includes coordinating charging at the transformer or other low level of aggregation in a power grid.

When an electric vehicle is plugged-in for recharging, a charger for the electric vehicle can use a power line communication (PLC) communication module for communicating with other chargers that are being serviced by the same, local distribution transformer. According to one aspect of the method and system, by using power line communications, chargers of the electric vehicles who are serviced by the same distribution transformer can form self-contained local area networks due to the nature of power line communications.

Specifically, the strength of the signals for power line communications are such that usually only chargers coupled to the same distribution transformer can communicate with one another. In other words, chargers coupled to a first transformer will likely not be able to detect or communicate with other chargers who are coupled to a second transformer due to the losses of power in the communication signals when they pass through transformers and are propagated over power lines for significant distances According to the method and system, after the chargers of the electric vehicles are coupled to one another through power line communications, they can form a communication network, such as a transformer local area network (LAN). Alternatively, or in addition to the power line communications, the chargers can be coupled to conventional computer-based LANs through gateway devices.

Each LAN can support a controlled communication timing system, such as a token ring network. According to this token ring network, a predetermined number of tokens can be assigned within the token ring network. Each token would represent a nominal amount of current (e.g. 30 Amps) that could be used to charge the vehicle. So that could charge at 50 Amps would need to collect two tokens to charge at full current. In one exemplary embodiment, one token may be assigned to a single electric vehicle out of a group of electric vehicles (with corresponding chargers) which are part of the token ring network. But more than one token may be provided, such as a plurality of tokens within a given token ring network, and is within the scope of the invention.

Only chargers with a token may receive energy from the distribution transformer. In this way, a distribution transformer is not overloaded by energy requests and trying to fulfill those energy requests for a plurality of vehicles which may be beyond the capacity of the transformer. In this way, overloading and possible failure of a distribution transformer may be prevented or avoided.

During formation of a token ring network or after all chargers of a particular network have completed their charging, a list can be generated to enumerate the chargers who are part of the network. This list can be stored in each charger's memory. Next, the first token or first set of tokens can be assigned to one or more chargers of electric vehicles within the network. The assignment of the first token or tokens can be made according to predetermined criteria. For example, such predetermined criteria can include an assessment of the permanent serial numbers that may be assigned to each charger. A charger with the highest or lowest serial number may be assigned to the first token. Other criteria beyond serial identification numbers of chargers for assigning the first token or first set of tokens is within the scope of the invention.

The charger assigned with the first token then can determine the priority of the token distribution within the token ring network. The charger assigned with the token can assess many variables associated with the charging of an electric vehicle in order to determine the order in which chargers should receive the token. For example, variables such as desired charge levels, amounts of charge needed for each vehicle, desired energy prices for charging a vehicle, the amount of time available compared to the amount of charge needed, and determining if any of the vehicles within the token ring network desire to upload and/or sell energy from a vehicle to the grid in order to alleviate the load of the distribution transformer.

Once the charger with the first token determines the priority or order in which the token should be passed from one charger to the next, the token is passed to the charger with the highest priority. Next, the charger with the token is able to start or initiate a download of energy from the transformer. While energy is being downloaded, the charger can constantly monitor the status of the energy storage unit which in many cases can be a battery or set of batteries. The charger can also monitor the status of the other chargers who are members of the token ring network. The charger assigned with the token can also monitor other variables in the token ring network.

For example, other variables which can be monitored by the charger assigned with the token ring can include, but are not limited to, monitoring the time of day; determining if there is enough time to charge the remaining vehicles within the time allotted by a vehicle owner; checking the current price for energy transfer to the energy storage units of the vehicles; checking to see if other new vehicles and their corresponding chargers have entered into the local network; determining if there have been updates by vehicle owners for desired time of charge completion; calculating a random time of day in order to initiate the cooperative charging process; checking for reductions in current selected by a charger for charging an energy storage unit and passing a token when a charger makes this selection of reduced current; and determining if some vehicles have extra energy to upload to the grid.

In a manner similar to that described for electric vehicles, other large load appliances besides electric vehicle chargers, such as HVAC units, could be added to the LAN and can run cooperatively with a power control mechanism. Further, the HVAC units along with other appliances, like an electric clothes dryer, could contain a communications processor operating via the HomePlug standard, or equivalent. An application could be run on this processor of the general appliance which enables the device to join a cooperative charging/powering network.

The inventive system can be coordinated with a central controller to further optimize the utilization of grid resources, such as by shifting charging load to a period of time where excess energy from other energy sources, such as from alternate fuel sources like a wind generating supply, is expected. One aspect of the invention is to optimize utilization of existing grid assets while also providing power for all appliances/loads desiring energy.

BRIEF DESCRIPTION OF THE DRAWINGS

FIG. 2C illustrates a user interface for an electric vehicle charger illustrated in FIG. 2A that can be accessed by a home computer or personal digit assistant (PDA) according to one exemplary embodiment of the invention.

FIG. 9 illustrates a prioritized token list which can be stored in each non-volatile memory of an electric vehicle charger that is a member of a token ring network according to one exemplary embodiment of the invention.

DETAILED DESCRIPTION OF EXEMPLARY EMBODIMENTS

A method and system provide for the cooperative and coordinated charging and discharging of electric vehicles. By using power line communications, chargers of the electric vehicles who are serviced by the same distribution transformer can form self-contained local area networks due to the nature of power line communications. After the chargers of the electric vehicles are coupled to one another through power line communications, they can form a token ring network. According to this token ring network, a predetermined number of tokens can be assigned within the token ring network for permitting chargers with tokens to charge respective electric vehicles while chargers without tokens must wait until they receive a token to initiate charging. By limiting the number of vehicles who are charging simultaneously, the load on a particular transformer which services several vehicles (households) is restricted to safe levels.

Figure 1:
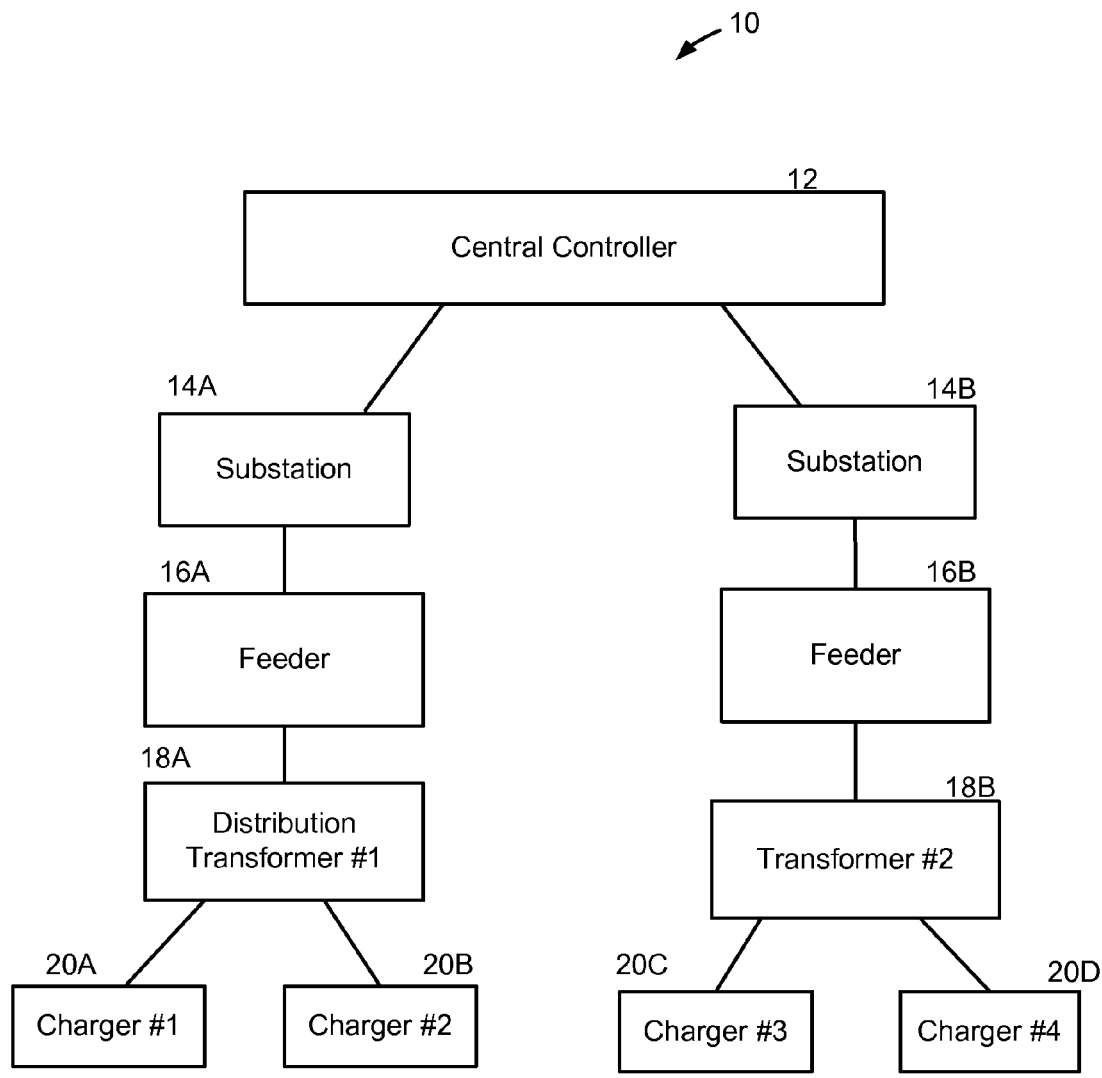
FIG. 1 illustrates a high level overview of a power grid system having a central controller for managing electric vehicle chargers according to a design of the prior art.
Figure 2A:
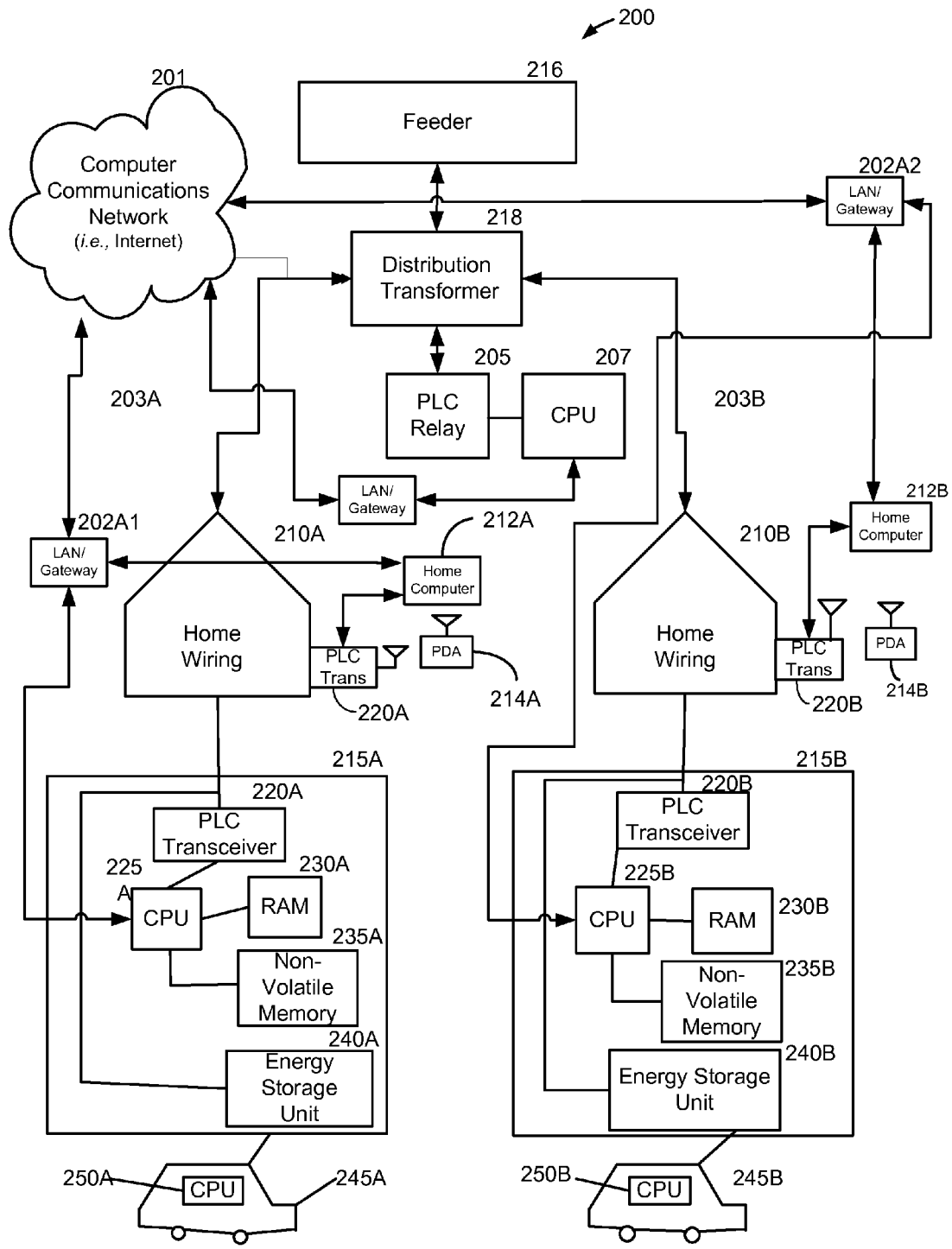
FIG. 2A is a functional block diagram illustrating a system for the cooperative charging of electric vehicles according to one exemplary embodiment of the invention.

Turning now to the drawings, in which like reference numerals refer to like elements, FIG. 2A illustrates a cooperative charging system 200 according to one exemplary embodiment that includes a feeder 216 that may supply electric power to a distribution transformer 218. The distribution transformer 218 may comprise a general purpose distribution transformer that may be rated for 600 volts and below. The distribution transformer 218 may be ventilated or totally enclosed and may include either aluminum or copper windings in standard ratings such as on the order of 50 Kilo Volt Amperes (kVA). The distribution transformer 218 can supply appliance, lighting, motorized machine, and power loads from electrical distribution systems such as the feeder 216. However, other sized distribution transformers 218 above or below 50 kVA are within the scope of the invention.

The distribution transformer 218 may be coupled to a power line communications (PLC) relay device 205. Further details of the power line communications used with the invention will be described in further detail below. The PLC relay device 205 may be coupled to a central processing unit (CPU) 207 that controls the transformer 218. The CPU 207 may also be designed to control all or issue control signals to each transformer 215.

The power line communications (PLCs) refer to in this description is a system for carrying data on conductors that may also be used for electric power transmission. Electrical power is typically transmitted over high voltage transmission lines, distributed over medium voltage, and used inside buildings at lower voltages. It is well understood to one of ordinary skill in the art that power line communications can be applied at each stage.

PLCs can connect loads between a distribution network and premises wiring for each premises connected to that transformer secondary. The power line communications systems used herein may operate by impressing a high frequency modulated carrier signal on the wiring system. Different types of power line communications can use different frequency bands, depending on the signal transmission characteristics of the power wiring used. Since many power wiring systems are usually intended for only transmission of alternating current power, many power wire circuits usually have a limited ability to carry higher frequencies. This propagation problem can be a limiting factor for power line communications; however, this propagation problem is used advantageously by the cooperative charging system described herein.

Because of the attenuation of power line communications over relatively short distances at higher frequencies, chargers 215 of electric vehicles 245 that are being serviced by the same, local distribution transformer 218 can form self-contained local area networks due to the propagation characteristic noted above. This means that the strength of the signals for power line communications are such that usually only chargers 215 of electric vehicles coupled to the same distribution transformer 218 can communicate with one another. As noted earlier, chargers 215 of electric vehicles 245 coupled to a first transformer 218 will likely not be able to detect or communicate with other chargers 215 who are coupled to a second transformer 218 (not illustrated) due to the losses of RF power in the communication signals when they are propagated over power lines 203 for significant distances and through two or more transformers 218.

Specifically, there is typically high frequency loss through the transformer. And usually, a signal from one house connected to a given transformer secondary would not easily propagate to a second house connected to a second transformer secondary since the high frequency attenuation through the first and second transformers would attenuate the signal from the first transformer.

The cooperative charging system 200 illustrated in FIG. 2A may support standard power line communications. For example, the cooperative charging system 200 may utilize industry standard power line communication systems such as HomePlug 1.0 which is a specification for home networking technology that couples devices to each other through power lines in a home 210. HomePlug certified products may couple personal computers and other devices such as chargers 215 for electric vehicles 250 that may also use other communication standards such as Ethernet, USB (Universal Serial Bus) and wireless local area network communications such as IEEE 802.11. Many devices may have the HomePlug standard built in such as the chargers 215 illustrated in FIG. 2A. With the HomePlug standard built-in into a charger 215, to connect the charger 215 to a network, all that is required is to connect the charger to the home wiring by plugging the charger 215 into an outlet of a wall in a home 210 or by wiring directly to a circuit breaker such that it may communicate with other devices on a common transformer that support the HomePlug standard.

Since the power line communication signals may travel outside of a home 210 to the distribution transformer 218, like many other network standards, the HomePlug power line communication standard includes the ability to set an encryption password. As with many other networking products, most HomePlug devices are "secured by default in which the standard may require that all devices supporting the standard are set to a default out-of-box password, which may be a common one. Users of the devices are encouraged to change this password for obvious reasons.

Devices which support the HomePlug power line communication standard may function as transparent network bridges which may allow computers running on any operating system to use them for network access. The HomePlug communication standard supports the ability to use Ethernet in a bus topology in which it has carrier sense, multiple access and collision detection.

This is achieved by the use of advanced orthogonal frequency division multiplexing (OFDM) that allows co-existence of several distinct data carriers along the same power-supplying wire. Use of OFDM allows turning off (masking) one or more of the subcarriers which overlap previously-allocated radio spectrum in a given geographical region. In North America, some HomePlug standards may only use 917 of an available 1,155 subcarriers.

Referring back to FIG. 2A, the distribution transformer 218 may be coupled to homes 210A, 210B by electrical power lines 203A, 203B. Each home 210 may include a power line communications (PLC) transceiver 220 that may be coupled to a home computer 212 or a personal digital assistant (PDA) 214 through an adapter. The personal digital assistant 214 can couple wirelessly with the PLC transceiver 220 of a home. The home computer 212 may have a hard wire connection or a wireless link with the PLC transceiver 220. The PLC transceiver 220 can support standard power line communications such as the HomePlug standard described above.

Alternatively, or in addition to the PLC transceiver 220, each home 210 may have access to a local area network (LAN) and/or a gateway 202A which is coupled to a computer communications network 201. The gateway 202 can work on all seven Open System Interconnection Reference Model (OSI Reference Model or OSI Model) layers. A layer may be defined as a collection of conceptually similar functions that provide services to the layer above it and receives service from the layer below it.

One job of the gateway 202 is to convert protocols among communications networks. The gateway 202 can comprise a router that transfers, accepts and relays packets only across networks using similar protocols. The gateway 202 may also accept a packet formatted for one protocol (e.g. AppleTalk) and convert it to a packet formatted for another protocol (e.g. TCP/IP) before forwarding it. A gateway 202 can be implemented in hardware, software or both, but it is usually implemented by software installed within a router. The gateway 202 can understand the protocols used by each network 201 linked into the gateway 202. The gateway 202 can comprise bridges, switches, and routers.

The gateway 202 can also comprise a network point that acts as an entrance to another network, like the computer communications network 201. On the Internet, a node or stopping point can be either a gateway node 202 or a host (end-point) node.

In enterprise systems, a computer server acting as a gateway node 202 is often also acting as a proxy server and a firewall server. A gateway 202 can also be associated with both a router, which knows where to direct a given packet of data that arrives at the gateway, and a switch, which furnishes the actual path in and out of the gateway for a given packet. Therefore, the gateway 202 can comprise one of a switch and a router.

Meanwhile, the computer communications network 201 may comprise a wide area network ("WAN"), a local area network ("LAN"), the Internet, or a combination of networks. The LAN/Gateway 202 may also couple the computer communications network 201 to each CPU 225 of a respective charger 215. The couplings between devices illustrated in FIG. 2A can be wired or wireless communication links.

By coupling each charger to the computer communications network 201, each charger 215 can communicate with the home computers 212 as well as respective, other chargers 215 through the computer communications network 201. Chargers 215 sharing a common secondary transformer 218 can then be interconnected into a LAN by commands from a central controller 12. This central controller 12 can have knowledge of the transformer to home connections from address information or from information received from an automated metering reading system installed in the area. However, these communications over the computer communications network 201 can be in addition (or supplemental) to the communications established by the power lines communication network devices 220A-220B.

The electrical wiring each home 210 may be coupled to a respective electric vehicle charger 215. Each electric vehicle charger 215 can be coupled to one or more electric vehicles 245. Each electric vehicle 245 may further include a central processing unit 225 that may manage operations of the electric vehicle 245, as well as an energy storage unit 240.

The PLC transceivers 220A1, 220B1, home computer 212, and PDA 214 are optional equipment. In alternative exemplary embodiments (not illustrated), each electric vehicle 245 can couple to the distribution transformer 218 automatically without a user adjusting settings for charging the energy storage unit 240 of the electric vehicle 245.

While illustrated as part of the electric vehicle charger 215, the energy storage unit 240 may physically be housed in the electric vehicle 245. The electric charger 215 may also be part of or may be physically housed in the electric vehicle 245. The electric vehicles 245 described herein can include pure electric and hybrid electric vehicles, such as plug-in hybrid electric vehicles (PHEVs), especially vehicles that have significant storage battery capacity and that connect to the power grid for recharging a battery. The electric vehicles 245 described herein typically obtain some or all of their energy for motion and other purposes from the power grid. Each electric vehicle 245 may have an energy storage unit 240. The energy storage unit may comprise batteries, capacitors or some combination thereof, or any other electrical storage mechanisms. Each electric vehicle 245 with its energy storage unit may or may not have the capability to provide power back to the electric grid.

Each electric vehicle charger 215 may be coupled to the wiring of a home 210 by a standard plug which is placed into an outlet of a wall or by a special high current receptacle not shown. Each electric vehicle charger 215 may comprise a power line communications (PLC) transceiver 220A2, 220B2, a central processing unit 225, random access memory (RAM) 230, and non-volatile memory 235. The central processing unit 225 of each electric vehicle charger 215 can be coupled to the PLC transceiver 220, the RAM 230, and the non-volatile memory 235. The CPU 225 can control when power can be drawn from the distribution transformer 218 for storage in the energy storage unit 240. The CPU 225 of each electric vehicle charger 215 can execute or run various program modules which are stored in RAM 230 and non-volatile memory 235. The non-volatile memory 235 may comprise ROMs or EEPROMS. Other hardware configurations for the electric vehicle charger are not beyond this scope of the invention.

In other words, the vehicle charger 215 may comprise firmware code executed on micro-controllers, micro-processors, or digital signal processors or state machines implemented in application specific integrated circuits or programmable logic, or other numerous forms without departing from the spirit of the invention. The electric charger 215 may be provided with computer programs that include machine readable mediums having stored thereon instructions which may be used to perform the processes described below for supporting the cooperative charging of electric vehicles 245. The machine readable medium and each electric vehicle charger 245 may include, but is not limited to, optical disc, CD-ROMs, magneto-optical disc, ROMs, RAMs, EPROMs, EEPROMs, magnet or optical cards, flash memory or other type of media-machine readable medium suitable for storing electronic instructions.

With the cooperative charging system 200 described herein, a first electric vehicle charger 215A can communicate with a second electrical vehicle charger 215B through the wiring of each home 210A, 210B and along the power lines 203A and 203B which are coupled to the distribution transformer 218. Since the electric vehicle chargers 215A are "intelligent" devices, they can logically control when each electric vehicle charger 215 will draw or supply power along power lines 203 that are coupled to the distribution transformer 218. In this way, as described above, each electric vehicle charger 215 may draw or supply its power at different times relative to other chargers 215 that are coupled to the distribution transformer 218. In this way, overloading and possible failure of the distribution transformer 218 may be prevented or avoided.

Figure 2B:
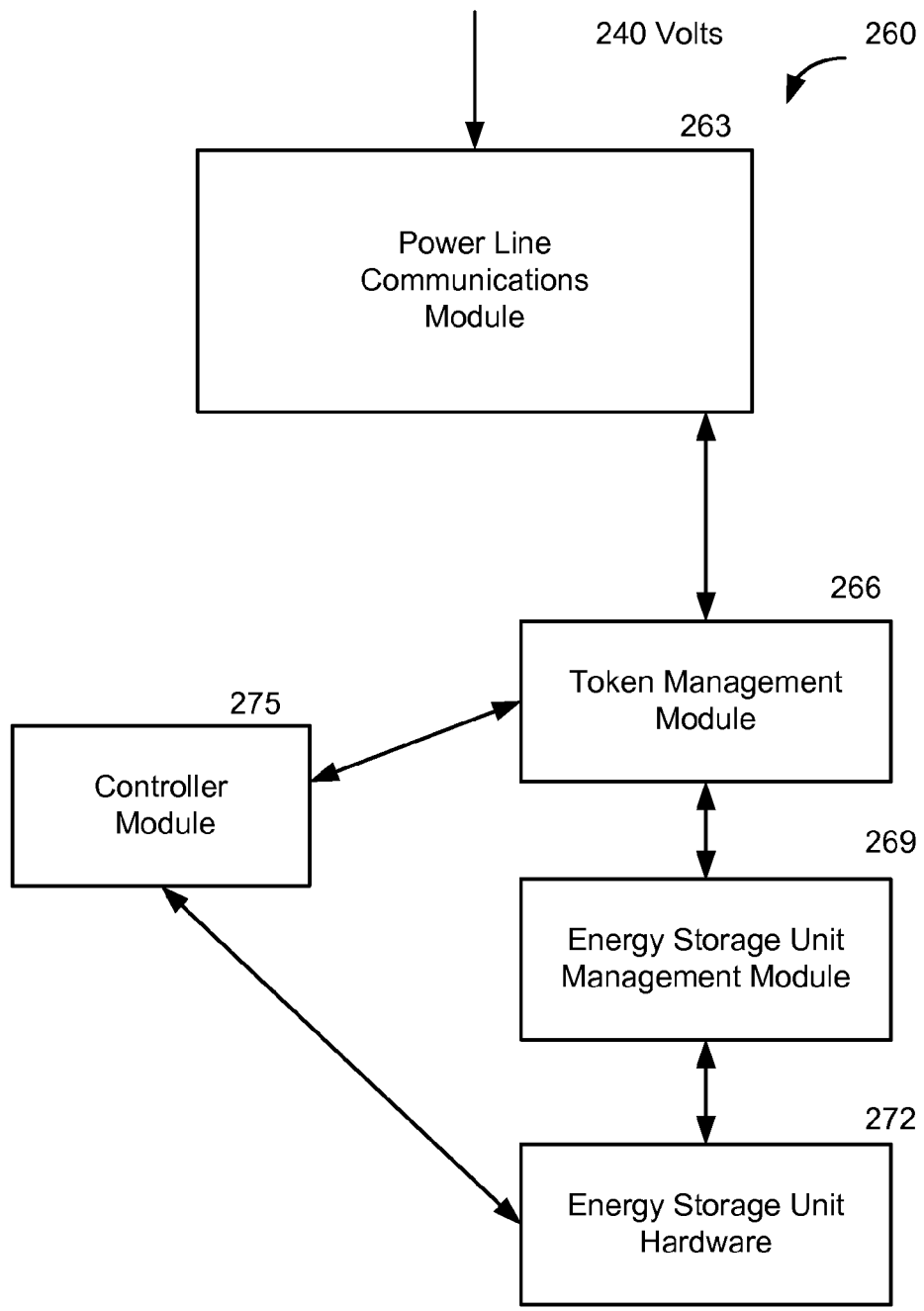
FIG. 2B is a functional block diagram illustrating software modules that can be executed or run by the central processing unit in a PLC transceiver of the vehicle electric chargers illustrated in FIG. 2A according to one exemplary embodiment of the invention.

Referring now to FIG. 2B, this figure is a functional block diagram illustrating some software components and hardware components associated with the electric vehicle charges 215 that are illustrated in FIG. 2A according to one exemplary embodiment of the invention. Specifically, FIG. 2B illustrates a system 260 of software and hardware components for the cooperative charging system 200.

The system 260 of software and hardware components can comprise a power line communications (PLCs) communications module 263, a token management module 266, an energy storage unit management 269, energy storage unit hardware 272, and a controller module 275. The power line communications module 263 can comprise programming or instructions that may reside within the PLC transceiver units 220A1, 220A2, 220B1, 220B2 as illustrated in FIG. 2A. The PLC module 263 may be coupled to and communicate with a token management module 266. The token management module 266, controller module 275, and energy storage unit management module 269 can reside in the non-volatile memory 235 of the electric vehicle charger 215. These three modules 266, 269, 275 can be executed or run by the central processing unit 225 of the electric vehicle charger 215 as illustrated in FIG. 2A. Alternatively, (not illustrated) the modules can also be part of the automobile 245.

The token management module 266 can manage the token ring logic and functions as will be described in further details in FIGS. 4, 5, and 6 below. The token management module 266 can communicate with the controller module 275 that may be responsible for all operations of an electric vehicle charger 215. The energy storage unit management module 269 may monitor the status of the energy storage unit hardware 272. The energy storage unit hardware 272 can include elements of the energy storage unit 240 such as batteries and capacitors. The energy storage unit management module 269 can determine the amount to charge remaining in the energy storage unit 240 as well as how long it may take to charge to fully charge the energy storage unit 240 at a particular power level.

The energy storage unit storage management module 269 can also monitor information that may be entered by a user of the electric vehicle 245. Specifically, the energy storage unit management module 269 can receive and manage data from a user who may enter in charge data through the personal digital assistant (PDA) 214, the home computer 212. The energy storage unit management module 269 can support a vehicle charge manager user interface that is described in further detail below in connection with FIG. 2C. Meanwhile, the controller module 275 can control one or more switches (not illustrated) that allow the energy storage unit 240 to be coupled to the wiring of the home 210 and ultimately the power line 203A that is coupled to the distribution transformer 218.

Referring now to FIG. 2C, this figure illustrates and exemplary display 274 that may be provided on the personal digital assistant (PDA) 214 or home computer 212 as illustrated in FIG. 2A according to one exemplary embodiment of the invention. The display 274 may provide a user interface 276 that comprises the vehicle charge manager. With this user interface 276, the energy storage unit management module 269 in FIG. 2B can receive data from a user of the electric vehicle 245 that may be relevant to how the electric charger 215 supplies energy to or takes energy from the energy storage unit 240A as illustrated in FIG. 2A. Specifically, a user may enter shortest distance data 278 (which would correspond to the minimum acceptable charge level and would correspond to the level of charge the user would choose if the kWh price were above a threshold) into the vehicle charge manager interface 276. Similarly, a user may enter longest anticipated distance travel data 280 (which would correspond to a nominal charge level, above which the user may be likely to sell power back into the grid) into the user interface 276. Based on this distance data 278, 280 the energy storage unit management module 269 may calculate the amount of charge that will be needed to be placed in the energy storage unit 240 based on a conversion of this distance data.

In addition to supplying distance data 278, 280, a user may also supply price point data 282 in dollars per kilowatt hour (kWh) which the user wishes to pay to purchase the energy to charge the energy storage unit 240. This price point data 282 can be one of the variables that are monitored by each respective electric vehicle charger 215 during the charging process or charging cycle. The user may also enter in upload energy data 284 to indicate whether excess energy that may be available in an energy storage unit 240 such that the electric vehicle charger 215 would upload excess energy in the energy storage unit 240 as appropriate to the distribution transformer 218 so that the energy uploaded is supplied to the grid where it might be used to a charge another electric vehicle 245 that desires to receive energy for completing a charge of its energy storage unit 240. The user may also indicate lowest price date 286 at which the user desires to sell an energy storage unit's excess energy.

Further, the user may also enter time and date data 288 in which the user will need the electric vehicle 245 to be appropriately charged for the estimated distance data inputted into the vehicle charge manager user interface 276. From this time and date data 288, the energy storage unit management module 269 can calculate the amount of time which will be needed to charge an energy storage unit 240 to the desired capacity of the user based on the distance data 280 entered by the user into the charge manager user interface 276. And additionally, a user may also enter an amount of reserve energy 289 that is desired beyond the amount calculated for a particular distance, where the particular distance is also entered by the user in the longest distance data field 280.

Figure 3:
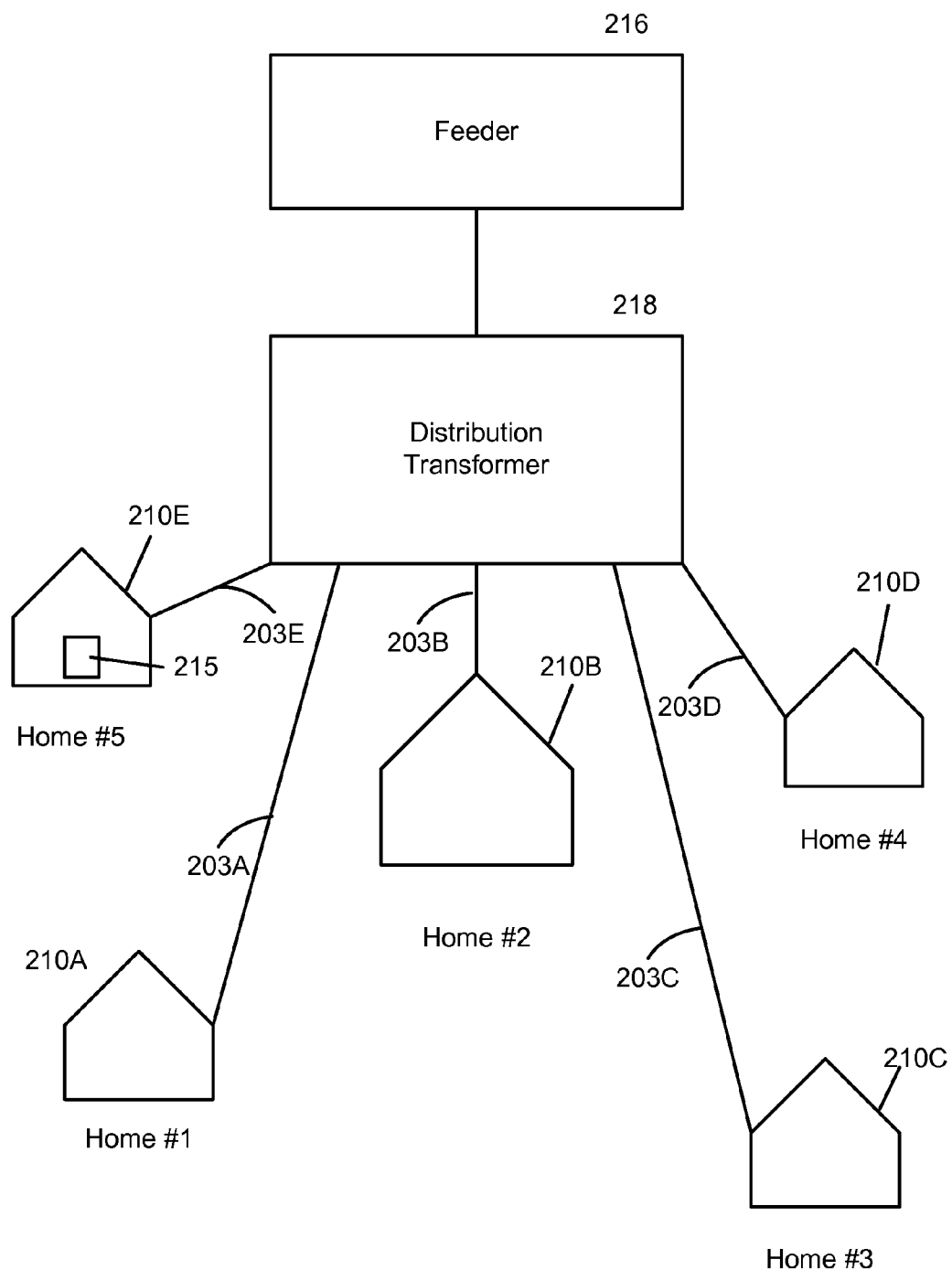
FIG. 3 is a functional block diagram illustrating multiple houses with electric vehicle chargers serviced by a single power distribution transformer according to one exemplary embodiment of the invention.

Referring now to FIG. 3, this figure is a functional block diagram illustrating a number of homes 210 which may be coupled to a particular distribution transformer 218 according to one exemplary embodiment of the invention. The homes 210 may be coupled to each other through copper wires 203 which may be joined in a central region of the distribution transformer 218. Each home 210 may comprise an electric vehicle charger 215 that is either separate from the electric vehicle 245 or is built into an electric vehicle 245. This figure illustrates a possible scenario of at least five homes 210A, 210B, 210C, 210D, and 210E, that may be coupled to a distribution transformer 218 by power lines 203A-E. As discussed above, if each electric vehicle charger 215 comes online and attempts to draw power from the distribution transformer at the same time then such a load may be very damaging to the distribution transformer 218 or such load could cause the distribution transformer 218 to have a major failure.

Figure 4:
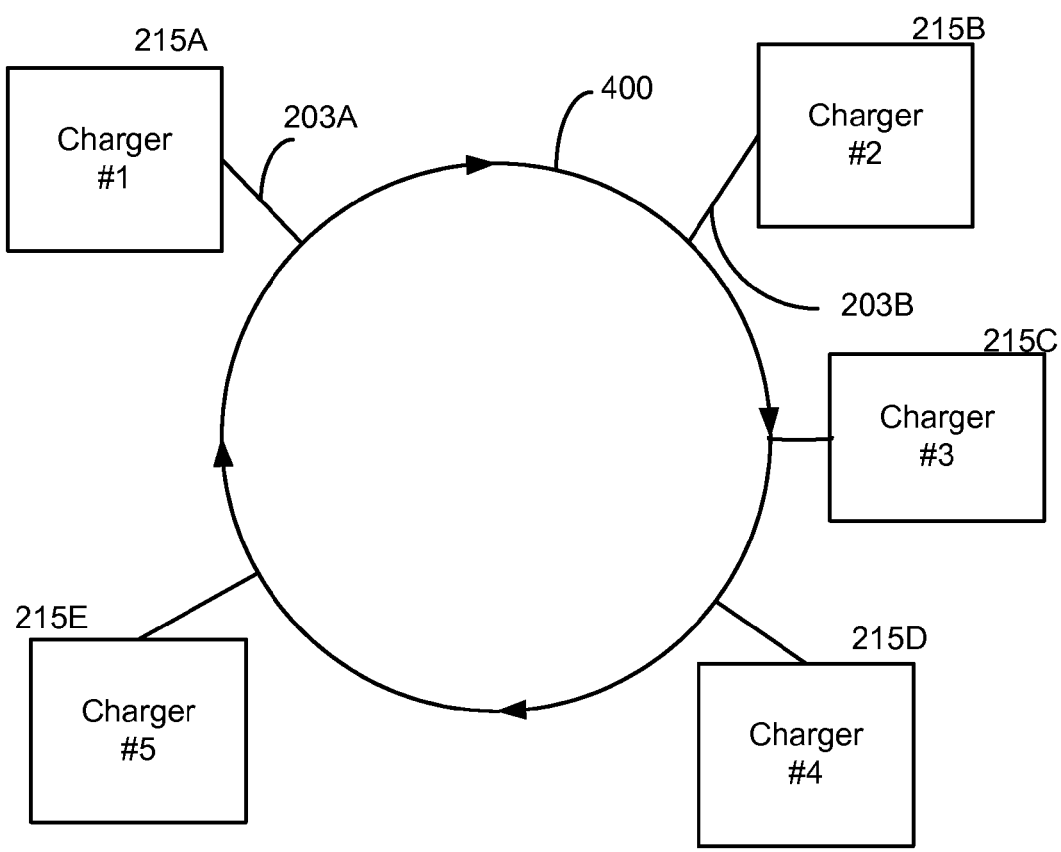
FIG. 4 is a functional block diagram illustrating an exemplary token ring network formed by electric vehicle chargers of the various homes as illustrated in FIG. 3 according to one exemplary embodiment of the invention.

Referring now to FIG. 4, this figure is a functional block diagram illustrating an exemplary token ring network formed by electric vehicle chargers of the various homes as illustrated in FIG. 3 according to one exemplary embodiment of the invention. The token ring system 400 can be employed such that each charger 215 is brought online at different times relative to another electric vehicle charger 215. The logical token ring 400 illustrates how a token from a first electric vehicle charger 215A can be passed along the logical token ring 400 to the next charger which could be the second charger 215B so that the second charger 215B comes online and establishes electrical connection along power line 203 when the second charger 215B has a token. The exemplary logical token ring 400 indicates how a token can be passed along the logic suggested by this figure. However, as will be described below, the token can be passed between respective chargers 215 based on priority.

That is, for example, after the first vehicle charger 215A has completed a charge of its energy storage unit 240, the token may be passed to the next prioritized electric vehicle charger 215 who is a member of the logical token ring 400. So this means, if a third electric vehicle charger 215C has a higher priority relative to a second electric vehicle charger 215B, then the third electric vehicle charger 215C would receive the next available token before the second electric vehicle charger 215B would receive a token.

Figure 5:
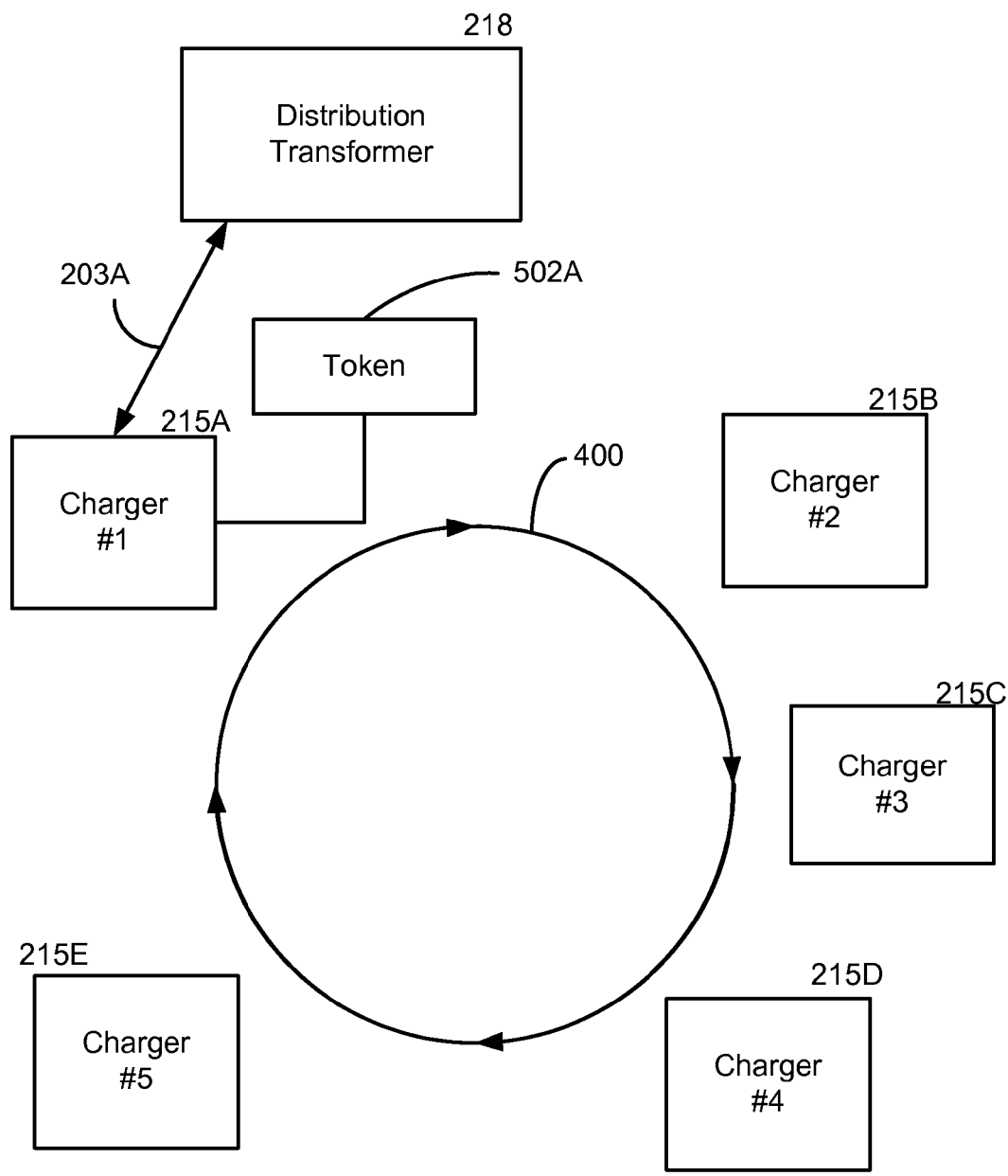
FIG. 5 is a functional block diagram illustrating an exemplary token ring network in which a first token has been assigned to a first electric vehicle charger according to one exemplary embodiment of the invention.

Referring now to FIG. 5, this figure illustrates an exemplary token ring network in which a first token 502A has been assigned to a first electric vehicle charger 215A according to one exemplary embodiment of the invention. The token 502A illustrated in FIG. 5 indicates a first electric vehicle charger 215A can establish an electrical connection with the distribution transformer 218 along a power line 203A. The remaining electric vehicle chargers 215B-215E have been illustrated without power lines 203B-E to signify that these electric vehicle charges have not established an electrical connection between the respective energy storage units 240 and the distribution transformer 218. The token 502A can simply be flag in a list which may enumerate a token order or rank 905 in a list of electric vehicle chargers 215 that may be part of a particular token ring system or network to the 400. Further details of the token 502A will be described below with respect to the flow charts of FIG. 7 and FIG. 8 and the prioritize token list 900 illustrated in FIG. 9.

Figure 6:
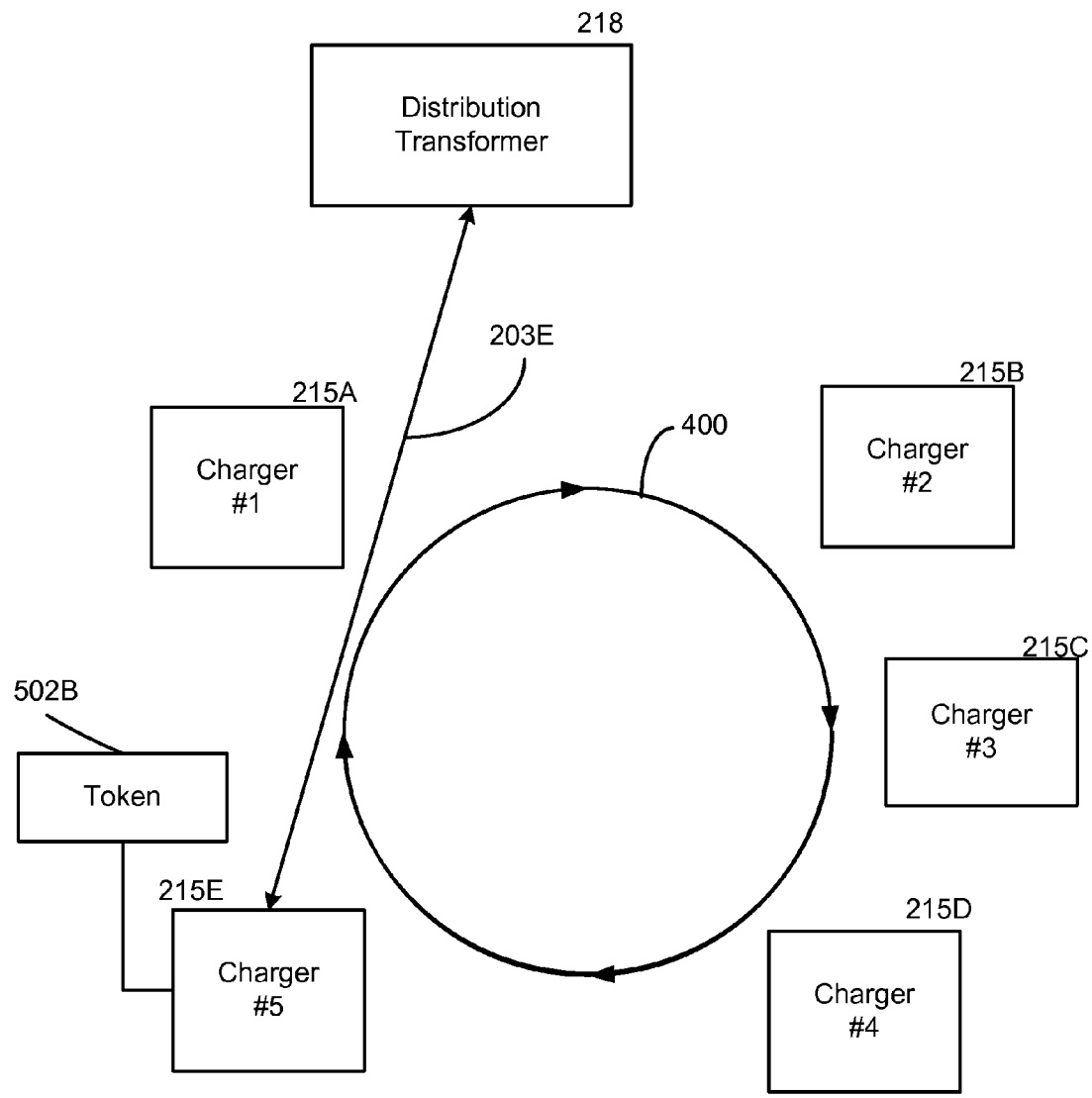
FIG. 6 is a functional block diagram illustrating the second token assigned to a second electric vehicle charger of a token ring network according to one exemplary embodiment of the invention.

Referring now to FIG. 6, this figures illustrates a second token 502B assigned to a second electric vehicle charger 215E of a token ring network according to one exemplary embodiment of the invention. FIG. 6 also illustrates that the first token 502A illustrated in FIG. 5 is no longer present. Alternatively, this conceptual diagram of FIG. 6 illustrates that the first token 502A may have been passed to the fifth vehicle charger 215E based on priority. Since the fifth electric vehicle charger 215 has the token 502B, the fifth electric vehicle charger 215E can establish an electrical connection between the distribution transformer 218 and its self along the power line 203E. The fifth charger 215E may draw power from the distribution transformer 218 or may supply power to the distribution transformer 218. One of ordinary skill in the art will recognize that the invention is not limited to a single token distribution and any number of tokens 502 can be distributed along the logical token ring 400 as long as the amount of tokens 502 which allow electric chargers to couple themselves to the distribution transformer to a team do not cause any damage or failures of the distribution transformer 218.

Similarly, one of ordinary skill in the art will recognize that the tokens 502 will be distributed along the logical token ring 400 so that some tokens allow electric vehicle chargers 215 to supply power to the distribution transformer 218 while other tokens 502 may allow other electric vehicle chargers 215 to draw power from or through the distribution transformer 218 such that the power from other electric vehicles 245 may be received by the electric vehicle chargers 215 can in turn place the drawn power into the energy storage units 240.

Figure 7:
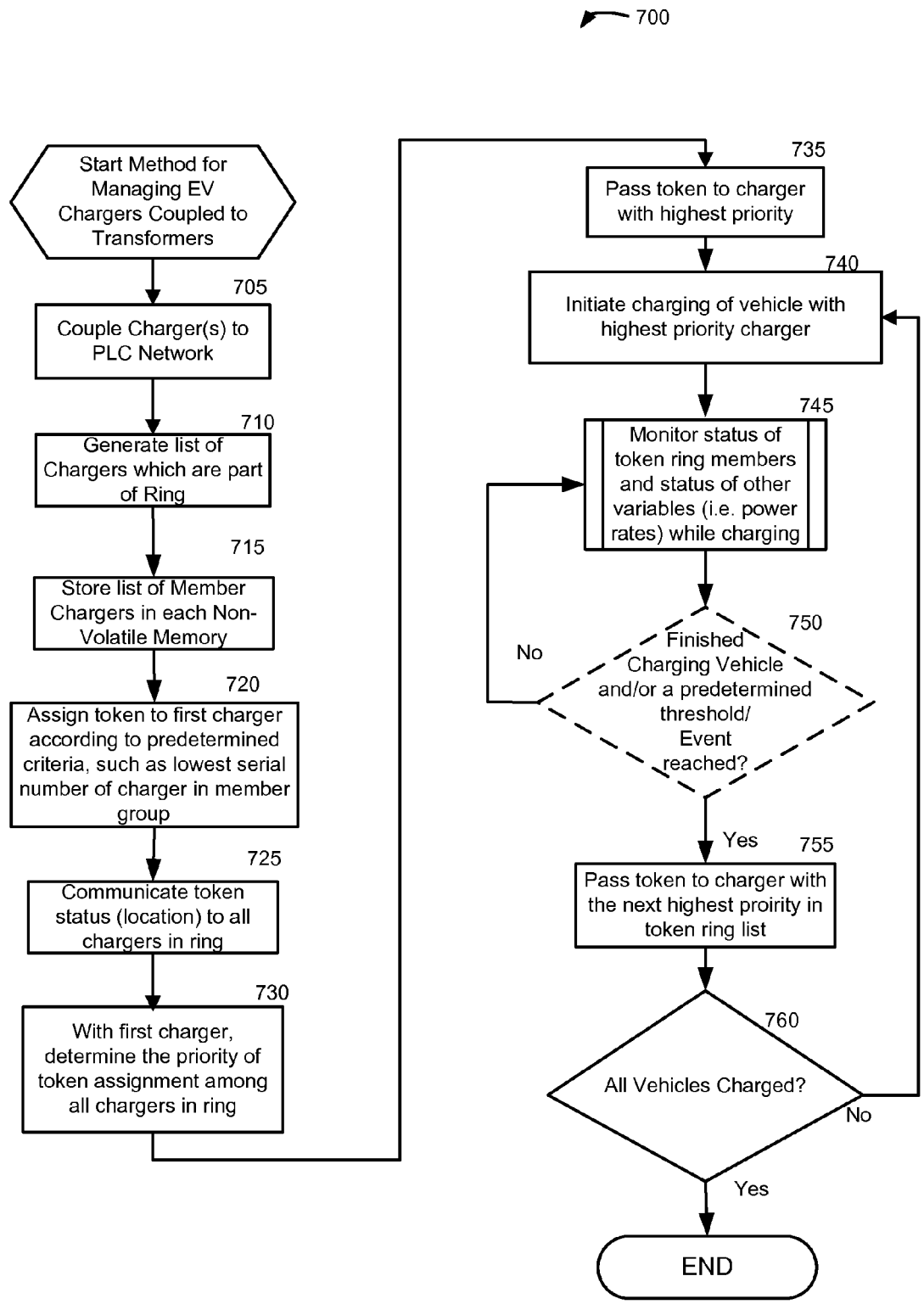
FIG. 7 is a logic flow diagram illustrating an exemplary method for managing electric vehicle chargers coupled to a power distribution transformer according to one exemplary embodiment of the invention.

Referring now to FIG. 7, this figure illustrates a logic flow diagram 700 of a method for managing electric vehicle chargers 215 coupled to a distribution transformer 218. Logic flow diagram 700 highlights some key functional features of the electric charger 215 of FIG. 2A. As noted above, one of ordinary skill in the art will appreciate that the process functions of the electric vehicle charger 215 may comprise from where a code executing on a microcontroller, microprocessor, a DSP, or state machines implemented in application specifics or programmable logical, or other numerous forms without departing from the spirit and scope of the invention.

In other words, these steps illustrated in FIG. 7 and other logic flow diagrams of this disclosure may be provided as a computer program which may include a machine-readable medium having stored there on instructions which may be used to program a computer (or other electronic devises) to perform a process according to the invention. The machine-readable medium may include, but is not limited, optical disk, CD-ROM, magneto-optical disks, ROMs, RAMs, EEPROMs, EEPROMs, magneto-optical cards, flash memory, or other type of medias/machine-readable mediums suitable for storing electronic instructions.

Certain steps in the processes or process flow described in all of the logic flow diagrams refer to in this specification must naturally precede others for the invention to function as described. However, the invention is not limited to the order of the steps described if such order or sequence does not alter the functionality of the present invention. That is, it is recognized that some steps may perform before, after, or parallel other steps without departing from the scope and spirit of the invention. It is also recognized to one of ordinary skill in the art that some steps could be dropped or not performed at all, and the remaining steps may still be performed relative to the dropped steps.

Further, one of ordinary skill and programming would be able to write such a computer program or identify appropriate hardware at circuits to implement the disclosed invention without difficulty based on the flow charts and associated description in the application text, for example.

Therefore, disclosure of a particular set of program code instructions or detailed hardware devices is not considered necessary for an adequate understanding of how to make and use the invention. The inventive functionality of the claimed computer implemented processes would be explained in more detail in the following description and in conjunction with the remaining figures illustrating other process flows.

Step 705 is the first step of the process 700 in which one or more electric vehicle chargers may be coupled to a power line communications network that can comprise power lines 203 as illustrated in FIG. 2A. Next, in Step 710, each CPU 225 of an electric vehicle charger 21510 whether it a list of charger which are part of the logical token ring 400 as illustrated in FIGS. 4 and 5. Each CPU 225 of particular electric vehicle charger 215 may store the list of member charges 215 in its respective nonvolatile memory 235.

In Step 720, the assignment of the first token or group of tokens can be made according to predetermined criteria. For example, such predetermined criteria can include an assessment of the permanent serial numbers that may be assigned to each electric vehicle charger 215. An electric vehicle charger 215 with the highest or lowest serial number may be provided with the first token 502. Other criteria beyond serial identification of the electric vehicle chargers 215 for assigning the first token or first set of tokens is within the scope of the invention.

In Steps 725, each of the electric vehicle chargers 215 can record the status of the first token assigned in the logical token ring 400. Next, in Step 730, the first charger such as the first charger 215A as illustrated in FIG. 5 which has the first token 502A can determine the priority or order in which the token or set of tokens should be passed from one electric vehicle charger 215 to the next. Once this order of priority list such as the list illustrated in FIG. 9 is established with the first vehicle charger 215A, the token 502 can be passed to the appropriate electric vehicle charger 215 with highest priority as illustrated by step 735 in FIG. 7.

In Step 740, charging of the electric vehicle 245 or the electric vehicle charger 215 with the highest priority can be initiated. In routine 745, the electric vehicle charger 215 with the token 502 can monitor the status of the token ring members as illustrated in FIGS. 4-6 as well as other variables such as power rates for charging. Further details of routine 745 will be described below in connection with FIG. 8.

Next, in decision Step 750, it is determined whether the electric vehicle charger 215 has completed a charge for the energy storage unit 240 of a particular electric vehicle 215 and/or if a predetermined threshold or a specific event tracked by the charger 215 has been reached. If the inquiry to decision Step 750 is negative, then the "no" branch is followed back up to routine 745. If the inquiry to decision Step 750 is positive, then the "yes" branch is followed to Step 755.

In Step 755, the token 502 can be passed to the electric vehicle charger 215 with the next highest priority in the token ring list 900 as illustrated in FIG. 9. In decision Step 760, if determined if all electric vehicles 245 who are members of a particular logical token ring network 400 have been charged.

If the inquiry to decision Step 760 is negative, then the "no" branch is followed back to Step 740 in which charging of the vehicle with the next highest priority is initiated. If the inquiry to decision Step 760 is positive, then the "yes" branch is followed and the process can then end. As noted above, one of ordinary skill in the art recognizes that multiple tokens 502 can be distributed in any given logical token ring network 400. Further, it is recognized by one of ordinary skill in the art that some tokens may be utilized for power consumption while other tokens follow to make allow for energy uploads from a particular energy storage unit 240 of an electric vehicle 245.

Figure 8:
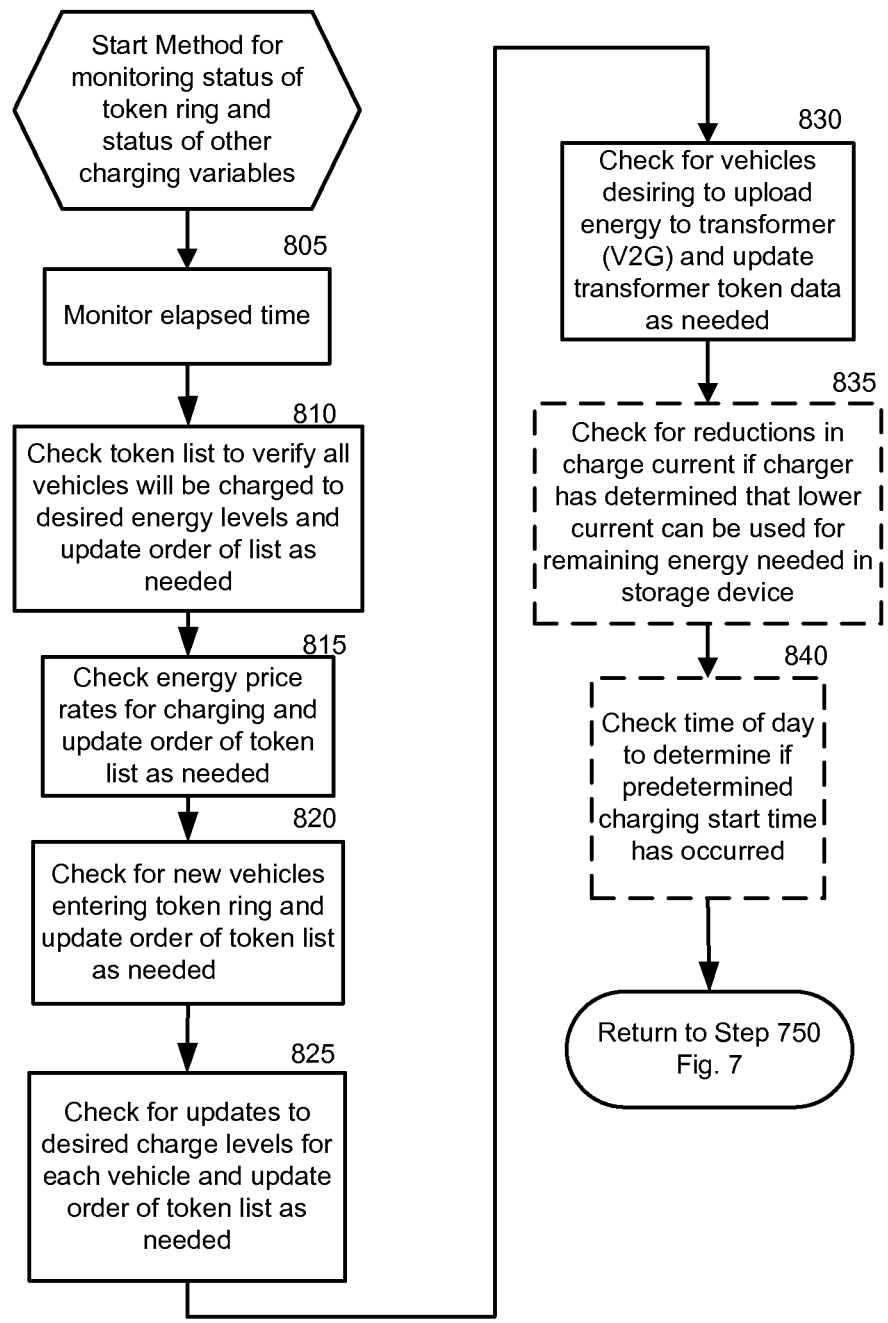
FIG. 8 is a logic flow diagram illustrating an exemplary routine for monitoring a status of electric vehicle chargers who are members of a token ring network according to one exemplary embodiment of the invention.

Referring now to FIG. 8, this figure illustrates a routine 745 for monitoring the status of a logical token ring 400 in status of other electric vehicle charging variables. Step 805 is the first step in the routine 745 in which elapse time can be monitored by the electric vehicle 215 having a token 502. Next, in Step 810, the electric vehicle charger 215 having a token 502 can check the token list 900 (as illustrated in FIG. 9) to verify that all vehicles 245 will be charged to desired energy levels and the electric vehicle charger 215 can update the order of priority of the list as needed based on its calculations to verify that all vehicles 245 will be charged in the time remaining to charge the vehicles 245.

In Step 815, the electric vehicle charger 215, which has a token can check the energy price rates for charging each electric vehicle 245 within the logical token ring 400 and the electric vehicle charger 215 with the token may update the order of the token list 900 as needed, depending on the particular energy rate that may be provided by the distribution transformer 218. In other words, as described above, each vehicle owner 245 may input a desired energy price rate at which to charge a user's electric vehicle 245. A user may input this price data in the vehicle charge manager interface 276 as illustrated in FIG. 2(c) and price data 282.

In step 820, a vehicle charger 215 assigned with a token 502 may also check for new vehicles entering the logical token ring 400, and it may update an order of the token list 900 as needed if a new vehicle electric charger 215 has come on board, which has a higher priority in charging relative to other electric vehicle chargers 215 already present in an existing logical token ring 400.

In step 825, a electric vehicle charger 215 with a token 502 can check for updates to desired charge levels for each vehicle 245. Specifically, it is possible that a user of a particular vehicle 245 in a particular logical token ring 400 may decide to change his or her desired charged vehicle time 288 as illustrated in FIG. 2(c). In such instances in which the desired charge vehicle time data 288 has been updated, then the electric vehicle charger 215 can update the order or priority of the token list 900 as needed. Also, it is also possible for each electric vehicle charger 215 to partially charge its respective vehicle 245 and then pass the token 502 on so that each energy storage unit 240 is incrementally charged rather than completely charged when a token 502 is first received for a particular charger 215. Such a partial charging algorithm could help vehicles 245 if a power failure occurs and that limits the available hours for charging each energy storage unit 240.

In step 830, the electric vehicle charger 215 assigned a token can also check for vehicles 245 desiring to upload excess energy in their energy storage units 240 to the distribution transformer 218, also known as a vehicle to grid (V2G) upload. The electric vehicle charger 215 assigned a token can update its transformer token data as needed. One of ordinary skill in the art recognizes that other variables associated with electric vehicle charging may be monitored with an electric charger 215 assigned a particular token without departing from the scope and spirit of the invention.

In step 835, each charger 215 may sense a change in drawn energy (usually electric current) such as when a charger switches from a full charge mode to a trickle charge mode to "top off" the charge and can relinquish the token 502 if the charge current drops below a threshold energy (electric current) value. If the charge current drops below this preset threshold (such as 10 Amps, for example), the charger 215 would relinquish the token 502 and continue to draw the reduced current without the need for the token 502. This allows the token 502 to be allocated earlier to other chargers 215 requiring higher current (e.g. >10 Amps) to charge.

This minimum threshold electric current value at which the token 502 is relinquished by a given charger 215 may be either preset by each charger 215, a single charger 215 within the group, or communicated from the CPU 207 coupled to the distribution transformer 218 by the PLC relay 205. Step 835 addresses those energy storage units 240 or chargers 215 that may charge at a high rate for a period of time and then a low rate at a later period of time, possibly near the end of the charge cycle, at which time the current may be reduced by the charger 215.

Next, in step 840, the charger 215 with the token 502 can check the present time of day to determine if a predetermined time of day has been reached. If the predetermined time of day has been reached, then the charger 215 can initiate the charging of its vehicle 245. It will often be the case that the loading on the transformer 218 will be such that it will not require all night to complete the charging.

Under these circumstances, it is desirable for the charger 215 to recognize the fact that charging of all vehicles 245 will not take the entire evening, so therefore the system, which is usually the first charger 215 selected to initiate the first charge, can pick a random time of day to start the cooperative charging process, as long as this start time allows the charging of all vehicles, with some margin for late additions to the network. This random time of day to initiate charging could be determined locally with the processors 225 on the chargers 215 or it could be communicated from the backend, such as from a central controller 12 and/or from the CPU 207 coupled to the distribution transformer 218 by the PLC relay 205. Next, the routine returns to step 750 of FIG. 7. Also, this randomized charge start time may not apply only to the first charger but to each charger on the transformer. For example, the standard operating mode of the chargers 215 may be to calculate the total charge time for all chargers 215 to complete charging (with some safety margin allowance for vehicles 245 arriving late in the time period) and to randomize the charge start times for the charging over this time period. If all transformers 218 in the network follow this algorithm, the total charging load presented to the system 200 will be relatively flat during the charging period, which could be advantageous. Alternatively, a utility company/organization may want to cluster the charges either early or late where they could allow a generator to run later to handle the load or start early to handle the load. Or the start time could be delayed if weather conditions would indicate a period of stronger wind, the vehicle charging could then make use of this excess capacity. The current invention facilitates all of these scenarios.

Referring now to FIG. 9, this Figure illustrates an exemplary prioritized token list 900 that can be stored in the non-volatile memory 235 of each electric vehicle charger 215 who may be a member of a logical token ring network 400. The prioritized token list 900 may comprise a token order or prioritized rank 905 in addition to identifying corresponding chargers assigned to a particular order or ranking. In other words, the prioritized token list 900 may include an electric vehicle identification column 910 that is associated with the token order/rank 905 column. The prioritized token list 900 may further comprise a column 915 that indicates charge status as well as a current token assignment. In other words, this column 915 of the prioritized token list 900 can identify if an electric vehicle 245 of a particular logical token ring 400 has been charged as well as indicating a current assignment of the token or plurality of tokens within a logical token ring network 400.

In the example illustrated in FIG. 9, the first charger (charger number 1) has been fully charged (or has dropped below the threshold requiring a token) as indicated by this status in column 915. Meanwhile, the fifth charger (charger number 5) which has been assigned the rank of 2 in the token order/rank list 905 has been assigned the token 502E as indicated by the "check" mark. One of ordinary skill in the art will recognize that each charger 215 may track or store the prioritized token list 900 at all times such that if a particular electric vehicle charger 215 fails, then the next ranking electric vehicle charger within the list 910 can follow the priority or order as enumerated in the prioritized token list 900. In this way, the logical token ring system 400 will not fail because one charger fails. This operates as a fail/safe mechanism for the token ring network 400 so that if one charger 215 fails, then the remaining chargers 215 may still be able to charge the respective energy storage units 240 by completing charging according to the prioritized token list 900.

Figure 10:
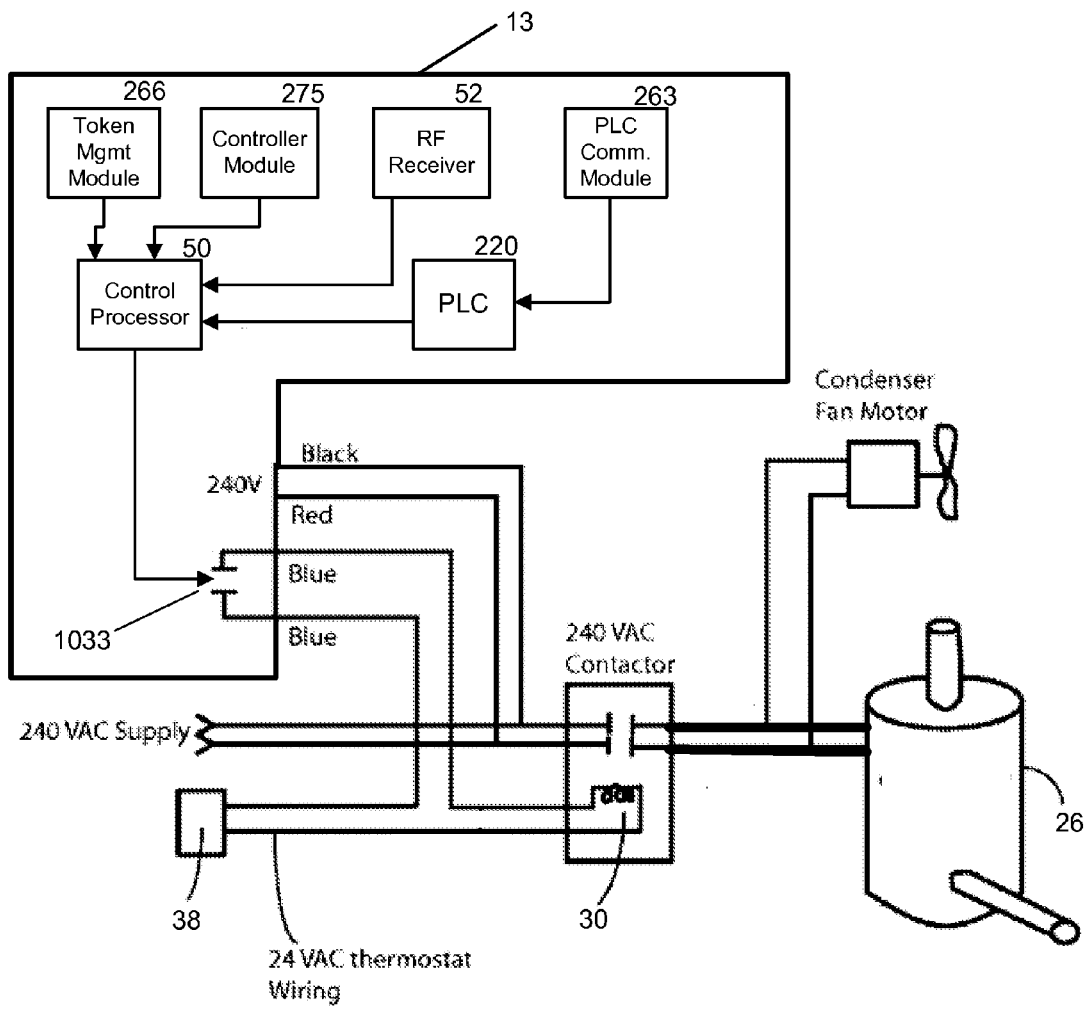
FIG. 10 is a functional block diagram illustrating a system for the cooperative powering of general electrical appliances according to one exemplary embodiment of the invention.

Referring now to FIG. 10, this Figure is a functional block diagram illustrating a system for the cooperative powering of general electrical appliances 26 according to one exemplary embodiment of the invention. An appliance 26 may comprise, but is not limited to, an air conditioning compressor, electric furnace, or heat pump. The system includes a control unit 13 having a relay 1033 that selectively opens the thermostat circuit that energizes the pull-in coil 30 for the 240 VAC compressor contactor.

The control unit 13 may comprise an RF receiver 52, a token management module 266, an RF receiver 52, a PLC communications module 263, a control processor 50, and a PLC 220. Elements labeled similar to those illustrated in FIG. 2B above will not be further described here.

In this exemplary embodiment for the control of powering appliances 26 similar to the electric vehicle chargers 215 discussed above, when the Control Contact 1033 in unit 13 is open, the compressor 26 will be held in an off state. When the Control Contact 1033 is closed, the thermostat 38 will control the compressor as it normally does. In a standard embodiment of control unit 13, the Control Contact state is dictated by remotely received RF commands in RF receiver 52 and the control processor 50 within the unit 13 acting on those commands. For the purpose of this invention, a parallel control mechanism is envisioned that will also control the Control Contact 1033 as dictated by the presence or absence of an enabling token 502 managed by the token management module 266, similar to FIG. 2B discussed above.

One suitable device for the control unit 13 is a Digital Control Unit (DCU) box manufactured by Comverge, Inc. The DCU box is designed to be coupled outside near the air conditioning compressor. The DCU box may additionally be employed for communication through various channels, including through wide area and local area networks to an energy provider. Another suitable device would be a thermostat 38 manufactured by Comverge, Inc. Rather than being disposed on the outside of a building, the thermostat 38 would be placed within the building.

The control unit 13 can comprise a PLC transceiver 220. The control unit 13 can support a token ring network 400, like that illustrated in FIGS. 4-6 discussed above. However, instead of the token ring network 400 being formed only by electric vehicle chargers 215, the token ring network 400 could be formed by general appliances 14 in combination with electric vehicle chargers or only among other general appliances 14. The PLC transceiver 220 in this embodiment, like the other embodiments above, can support standard power line communications like HomePlug 1.0, as discussed above.

Alternative embodiments of the cooperative charging or powering system 200 will become apparent to one of ordinary skill in the art to which the invention pertains without departing from its spirit and scope. Thus, although this invention has been described in exemplary form with a certain degree of particularity, it should be understood that the present disclosure is made only by way of example and that numerous changes in the details of construction and the combination and arrangement of parts or steps may be resorted to without departing from the scope or spirit of the invention. Accordingly, the scope of the present invention may be defined by the appended claims rather than the foregoing description.

What is claimed is:

1. A cooperative charging system comprising:
 a charger including a communication transceiver, and
 a central processing unit for executing instructions stored in a computer readable medium that include:
  determining a priority for a token assignment among the one or more members of a token ring network, the token assignment comprising a list of one or more chargers that are designated to receive a token based on the priority, wherein a receipt of a token permits a charger to start one of an upload and download of electricity; and
  passing the token to a charger.

2. The system of claim 1, wherein the charger is coupled to an energy storage unit.

3. The system of claim 2, wherein the energy storage unit comprises at least one of a battery and a capacitor.

4. The system of claim 3, wherein the charger is coupled to an electric vehicle.

5. The system of claim 4, wherein the electric vehicle comprises one of a pure electric vehicle and plug-in hybrid electric vehicle (PHEV).

6. The system of claim 1, wherein the communications transceiver operates according to a standard protocol.

7. The system of claim 1, wherein the communications transceiver comprises a power line communications transceiver.

8. The system of claim 1, wherein the communications transceiver comprises a local area network communications device.

9. A method for establishing a cooperative charging system comprising:
 generating a list of one or more chargers who are members of a token ring network;
 assigning a token to a first charger according to predetermined criteria;
 determining a priority for a token assignment among the one or more members of the token ring network;
 passing the token to a charger with the determined priority using a communications transceiver comprising a gateway; and
 initiating charging with the charger with the determined priority.

10. The method of claim 9, further comprising monitoring a status of chargers who are members of the token ring network while charging with the charger having the determined priority.

11. The method of claim 9, wherein the predetermined criteria comprises a determination based on a permanent serial number assigned to the charger.

12. The method of claim 9, wherein determining the priority for the token assignment comprises assessing an amount of time available to charge a respective electric vehicle coupled to a charger.

13. The method of claim 9, wherein determining the priority for the token assignment comprises assessing an amount of charge needed for a respective electric vehicle coupled to a charger.

14. The method of claim 9, wherein determining the priority for the token assignment comprises assessing a current rate of electricity available for charging an electric vehicle.

15. A system for establishing a cooperative charging system comprising:
 means for generating a list of one or more chargers who are members of a token ring network;
 means for assigning a token to a first charger according to predetermined criteria;
 means for determining a priority for a token assignment among the one or more members of the token ring network;
 means for passing the token to a charger with the determined priority using a communications transceiver comprising a gateway; and
 means for initiating charging with the charger with the determined priority.

16. The system of claim 15, further comprising means for monitoring a status of chargers who are members of the token ring network while charging with the charger having the determined priority.

17. The system of claim 15, wherein the predetermined criteria comprises a determination based on a permanent serial number assigned to the charger.

18. The system of claim 15, wherein the means for determining the priority for the token assignment comprises means for assessing an amount of time available to charge a respective electric vehicle coupled to a charger.

19. The system of claim 15, wherein the means for determining the priority for the token assignment comprises means for assessing an amount of charge needed for a respective electric vehicle coupled to a charger.

20. The system of claim 15, wherein the means for determining the priority for the token assignment comprises means for assessing a current rate of electricity available for charging an electric vehicle.

* * * * *